United States Patent

[11] 3,604,005

[72] Inventor Ralph Edward Gilmore
2760 N.W. 18th, Oklahoma City, Okla. 73107
[21] Appl. No. 31,305
[22] Filed Apr. 23, 1970
[45] Patented Sept. 7, 1971

[54] REMOTE CONTROL BY RELAYS OF COMPONENTS OF AN INTERNAL COMBUSTION ENGINE-POWERED VEHICLE
9 Claims, 2 Drawing Figs.

[52] U.S. Cl. .................................................. 343/225,
180/82, 290/38, 325/393
[51] Int. Cl. ....................................................... H04b 7/14,
H02p 9/08, F02n 11/08
[50] Field of Search ............................................ 340/52, 52
F, 53, 54; 343/225, 228; 180/82; 290/38; 325/392,
393

[56] References Cited
UNITED STATES PATENTS
3,396,811 8/1968 Bowers et al. ................. 340/53
3,455,403 7/1969 Hawthorne ..................... 290/38
3,530,846 9/1970 Bean et al. ...................... 290/38

Primary Examiner—Robert L. Griffin
Assistant Examiner—James A. Brodsky
Attorney—Rommel & Rommel ABSTRACT: The disclosure relates primarily to a compact relays-and-choke solenoid-operated system for remote control energization of electrical components of an internal combustion engine-operated vehicle. Electrically associated with the relays are a wireless transmitter and wireless receiver and various additional electrical components necessary for proper functioning of the system, most of which system is housed within a container for protection and portability since the system may be readily transferred from one vehicle to another.

PATENTED SEP 7 1971 3,604,005

INVENTOR
Ralph E. Gilmore

BY Rommel and Rommel

ATTORNEYS 3,604,005

REMOTE CONTROL BY RELAYS OF COMPONENTS OF AN INTERNAL COMBUSTION ENGINE-POWERED VEHICLE

This invention relates to electrical systems, employing a plurality of relays, associated with other components, including a choke solenoid, for the remote-controlled energization and deenergization of conventional electrical components of a vehicle.

Such conventional components may include, for example, the starting circuitry, the ignition circuitry and its associated circuitry, the lighting circuitry, and the automatic choke mechanism.

The prior art has disclosed other remote-controlled systems for the energization and deenergization of electrical components of a motor vehicle, but they have been relatively large, often complicated, and not adapted for ready incorporation in the vehicle without making alterations in the vehicle's structures to accommodate them, and cannot be regarded as portable for easy removal from one vehicle and housing in another.

Important objects of the invention are to provide a system as above described in the first paragraph of this specification and which is portable; may be installed in motor vehicles without altering the functions of the vehicle's circuitry or other standard equipment and mechanisms, when the system is in use; may be embodied as accessory or standard equipment; and may be adapted to various types of remote control.

Another important object of the invention is to provide a system as above described which protects against intermittent phantom or false starting of vehicle internal combustion engines.

Still another important object is to provide a system which may be removed from one vehicle and transferred to another by those who are acquainted with the system, and may be positioned in various convenient locations in vehicles.

Additional important objects are to provide precautionary measures against tampering with the system, and safety features for use in various locales.

Still another important object is to provide means for the sealing in a compact arrangement, of various components of the system for protection against dust, moisture, grease and the like.

An additional important object of the invention is to provide, for association with relays, a choke solenoid constructed and arranged to return thevehicle's* automatic choke mechanism to a start position by activating the accelerator linkage.

Other objects and advantages of the invention will be apparent during the course of the following detailed description of the invention, taken in connection with the accompanying drawing, forming a portion of this disclosure, and in which drawing.

In the drawing, wherein for the purpose of illustration is shown a preferred embodiment of the invention and wherein similar reference characters designate corresponding parts throughout the several views, the letter A may designate the system as a whole.

The system A of this invention includes a preferably portable (as a manually held) wireless transmitter B; a wireless receiver C; a receiver relay D; a delay relay E; a latch relay F; a selector relay G; a power relay H; a protective relay J; a manually operated electric on-off switch K; signal lamp L; power solenoid M; electron tube N; and an enclosure O for components of the system.

The transmitter B a conventional one adapted to transmit coded signals to the receiver C. The transmitter may be battery-powered as is well known in the art.

The receiver C is preferably a 12-VDC-powered one, which is matched or tuned to the transmitter B to receive the signals therefrom and amplify them to activate the receiver relay D which is incorporated in the receiver. Polarity must be taken into consideration when connecting the receiver.

The delay relay E is an SPDT relay which normally has closed contacts but, when activated, will delay contact-opening for a fixed interval of time (in seconds) as is well known in the art.

The latch relay F is a DPDT relay, with the armature adapted to remain in one of two positions on alternate energizing cycles of the coil thereof.

Figure 1:
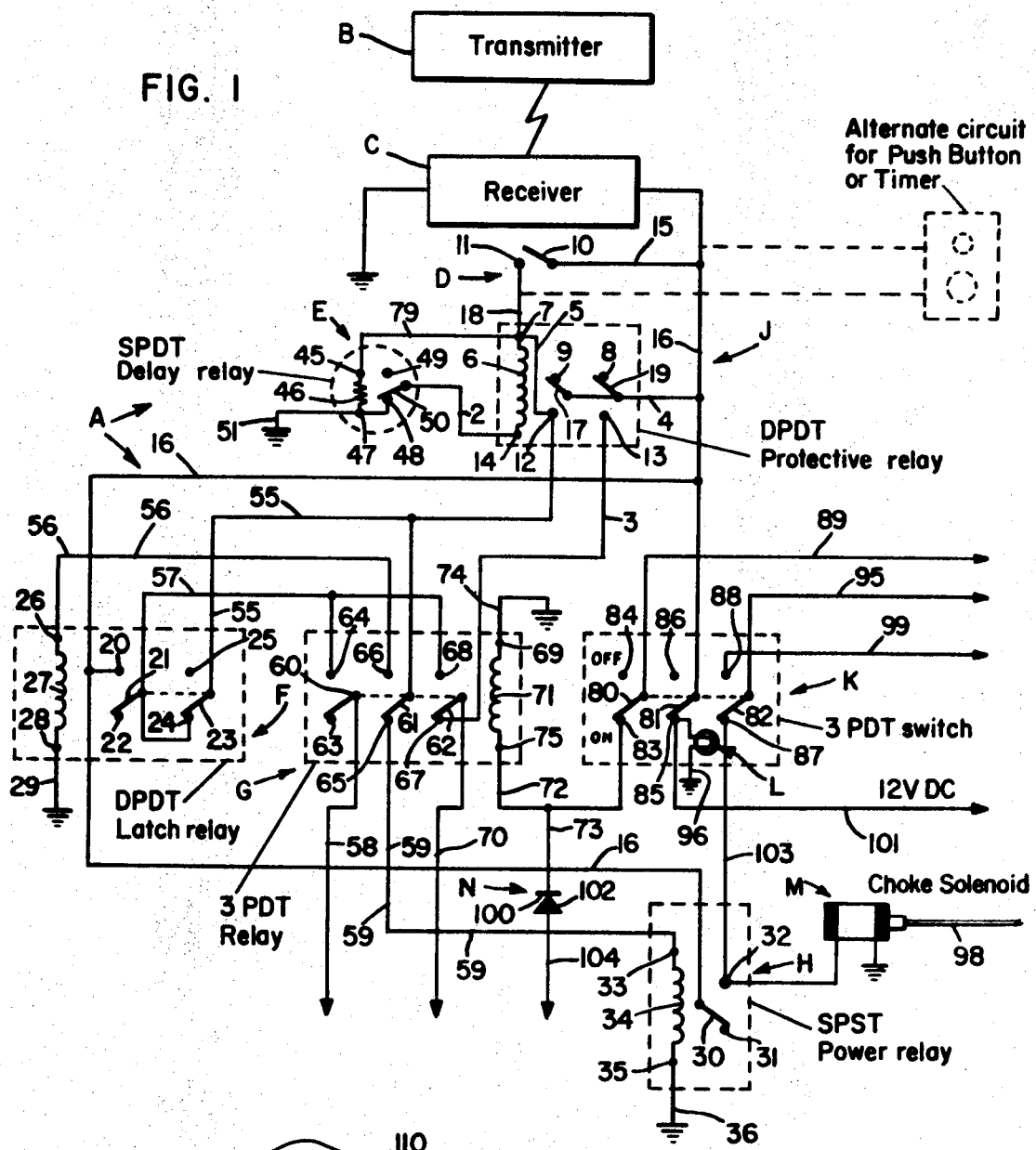
FIG. 1 is an electrical-wiring diagram of the system of this invention.

The selector relay G is a 3PDT relay which is indicated in FIG. 1, as deactivated, and its several functions detailed subsequently.

The protective relay J is a DPDT relay which protects the system and provides current for the system operation and ignition circuits during starting and stopping operations.

The manually operated electric on-off switch H is a 3PDT switch adapted to disconnect the system to or from existing electric circuitry and is shown in FIG. 1 in the "on" position and electrically in circuit with the signal lamp K.

The power solenoid L is one adapted to be operatively connected mechanically to the existing accelerator and choke linkage of an internal combustion engine.

The electron tube M is preferably a diode, adapted to protect the existing generator and storage battery circuitries of the vehicle, or relay G, in the circumstance that the switch H is in the "on" position, with the internal combustion engine not in operation and the conventional electric light switch is in the "on" parking lights position.

The components D to N inclusive are electrically interconnected as follows:

The armature 10 of receiver relay D is electrically connected by leads 15 and 16 to the contact 20 of the latch relay F, and to the armature contact 30 of the power relay H. Contact 11 of the receiver relay D is electrically connnected by way of lead 18 to the terminal 7 of the coil 6 of protective relay J.

The delay relay E consists of terminals 45 and 47 of heater 46, contact 48, and stop 49. Terminal 45 is electrically connected by way of lead 79 to terminal 7 of coil 6 of the protective relay J. Contact 48 and terminal 47 are electrically connected and grounded through lead 51. Armature 50 is electrically connected to terminal 14 of the protective relay J.

Armatures 17 and 19 of the protective relay J are electrically connected to lead 16 by way of lead 4. Contact 13 is electrically connected to contact 67 of selective relay G. Terminal 7 of coil 6 is electrically connected by way of lead 5 to contact 12 which is, in turn, electrically connected with lead 55 extending to armature contact 23 of the latch relay F, and armature contact 61 of the selector relay G.

Referring now to the latch relay F, the contact 20 is electrically connected with lead 16 as described above and is adapted for contact with the armature contact 21, which armature contact may be alternately also thrown to contact the stop 22. The armature contact 23, which is electrically connected with the lead 55, is adapted to contact, alternately, the contact 24 or stop 25. The terminal 28 of the coil 27 is grounded as at 29. As may be seen in FIG. 1, the armature contact 21 is electrically connected with contact 68 of selector relay by a lead 57. From the coil terminal 26, a lead 56 extends to a contact 66 of the selector relay G. From armature 21, the lead 57 also extends to contact 64 of selector relay G, as well as to contact 24 of the latch relay F.

Selector relay (3PDT relay) G includes armature contacts 60, 61 and 62. The first armature contact 60 has alternate contact with stop 63 or contact 64; the armature contact 61 has alternate s with contacts 65 or 66; and the third armature contact 62 has alternate contact with the contacts 67 or 68. The first armature contact 60 may be electrically connected as by lead means 58 to the accessory terminal or binding post of the conventional ignition switch (not shown) of the vehicle's electrical system. The second armature contact 61 is electrically connected, as by lead 55 to a stationary contact 12 of the protective relay J. The third armature contact 62 may be electrically connected as by lead means 70 to the ignition post on the ignition switch (not shown) of the vehicle's electrical system. Contact 65 is electrically connected as by lead 59 to terminal 33 of the coil 34 of the power relay H.

One terminal 69 of the coil 71 of the selector relay G is grounded as at 74, and the other terminal 75 is electrically connected with a lead 72 to the "on" contact 83 of the switch K, and electrically connected as by lead 73 to the plate electrode 100 of the diode N. Contact 64, for contact by the first armature contact 60, is in electrical connection with lead 57; contact 66 for contact with the second armature contact 61 is electrically connected with lead 56 for contact with the terminal 26 of the coil 27 of the latch relay; contact 68 is electrically connected by the lead 57 to the contact 64 and to the armature 21 of the latch relay F.

The SPST power relay H has its armature 30 constructed and arranged for alternate contact with either of the stop 31 or contact 32. The armature 30 is electrically connected with lead 16 which extends to the wiring of the receiver C. Contact 32 is electrically connected by lead 103 with the contact 87 of the switch K. Terminal 33 of coil 34 is electrically connected by lead 59 with contact 65 of the 3PDT selector relay G, while the terminal 35 is grounded as at 36, while contact 32 has lead 103. As depicted in FIG. 1, contact 32 is also electrically connected to the choke solenoid M.

The 3PDT electric switch K includes the switch arm contacts 80, 81 and 82. The first switch arm contact 80 is adapted to make contact with either "on" contact 83 or "off" stop 84. The second switch arm contact 81 is adapted to make contact with either the contact 85 or stop 86. The third arm contact 82 is adapted to make contact with either the contacts 87 or 88. The first switch arm contact 80 may be electrically connected, as by conductor means 89 to the generator or alternator (not shown) electrical output of the internal combustion engine. Switch arm contact 81 is connected to the receiver C by lead 16. Switch arm contact 82 may be electrically connected as by conductor means 95 to the solenoid post (not shown) of the internal combustion engine starter. As for lead connections of the electrical portion of the switch K, with other portions of the system A, there is a lead 72, from the contact 83 to the terminal 75 of the coil 71 of the selector relay (3PDT relay) G, and to the plate 100 of the diode N. The switch contact 85 is in circuit with one conductor 101 of the 12-VDC supply, and with one terminal of the filament of the signal lamp L. The contact 88 may be electrically connected as by conductor means 99 with the solenoid post (not shown) of the conventional combustion engine ignition switch. Contact 87 is electrically connected, as by lead 103 to the contact 32 of the power relay H.

The signal lamp L may be an ordinary filament electrical lamp, such as used on the instrument board of motor vehicles. Its ground is indicated at 96.

The choke solenoid M is a conventional power solenoid which may be operatively connected mechanically as by the linkage rod 98 to the existing accelerator and choke linkage (not shown) of the internal combustion motor vehicle.

The electronic tube N is shown diagrammatically as a diode, with plate electrode 100, and cathode 102 may be electrically connected as by conductor means 104 to the parking light post (not shown) of the conventional electric parking light switch. Otherwise, circuit connection has been described.

The enclosure O for housing components of the system A of this invention is preferably a relatively small one, readily installed in a motor vehicle at some convenient location and taking up but little room. The enclosure preferably comprises a metallic hood 110 and metallic base 111 upon the upper surface of which the hood and components within the enclosure are disposed. The hood may be secured, as by a conventional lock, to the base. The conductor and lead means extending from the enclosure correspond with those of the wiring diagram (FIG. 1). Obviously, an alternate electric circuit for the employment of a conventional manually operated pushbutton switch, or a timer may be substituted by leads from the terminals of the pushbutton switch or timer, extending to the leads 16 and 18, as shown by the dash-lines in the upper right corner portion of FIG. 1.

The system A of this invention is connected into the existing circuitry of the motor vehicle as follows: A linkage connection is made from the linkage rod 98 of the choke or power solenoid M to the accelerator and choke linkage. Switch arm 80 of the switch K is connected by the conductor means 89 to the generator or alternator output, as the case may be. Contact 85 of the switch K is connected by conductor means 101 to the 12-VDC post on the ignition switch of the motor vehicle. Contact 88 of the switch K is connected, by conductor means 99 to the solenoid post on the ignition switch of the vehicle. Switch arm 82 is connected through lead 95 to the solenoid post on the engine starter (the existing lead from the solenoid post on the ignition switch to the solenoid post on the starter solenoid may be severed to furnish leads 95 and 99 for installing the switch K). Armature contact 60 of the selector relay G is connected by conductor means 58 to the accessory post on the ignition switch of the vehicle, and armature contact 62 of the selector relay is connected by conductor means 70 to the ignition post of the ignition switch of the vehicle. The electron tube (diode) N is connected to the parking light post on the light switch of the vehicle through conductor means 104 and through leads 72 and 73 to the terminal 75 of the coil 71 of the selector relay G, thus precluding current flow toward the generator or alternator of the vehicle.

The function of the system components and the operation of the system are described in the following statements: The 3PDT switch K which connects the system A into existing circuitry is manually operated and must be in the "on" position for the system A to operate. The function of switch K is to provide a 12-VDC source to the system, and to reroute the starter and generator (or alternator) circuitry through the system.

The function of the SPDT delay relay E is to provide a timing circuit means for protection of other electrical circuits.

The function of the DPDT protective relay J is to provide protection means for receiver relay D, and means to provide for current flow to ignition circuits for starting purposes.

The function of the DPDT latch relay E is to provide means to supply current to the accessory or ignition system, as required, through the selector (3PDT) relay F. The function of the selector (3PDT) relay F is to provide means to supply current to the accessory, ignition, or starting solenoid circuitry on a timely basis as determined by the generator or alternator output. The relay G also provides a means of activating the latch relay. The function of the SPST power relay H is to provide source means for a heavy current to the starting solenoid of the vehicle. The function of the choke solenoid M is to provide means to activate choke and accelerator linkage for the proper fuel-air mixture and acceleration for starting purposes. The function of diode N is to provide protection means to insure against reverse current flow through the generator or alternator circuitry. The function of the indicator light L is to provide means to indicate that the system A is armed for operation.

The 3PDT electric switch K must be in the "on" position for the system A to operate. When the transmitter B is activated, coded signals are sent to the receiver C. Receiver C amplifies the signals to activate the receiver relay D. Receiver relay D is closed as long as proper signals are received. When the receiver relay D closes, a 12-VDC source is conducted through lead 18 to activate the protective relay J. Relay J furnishes a 12-VDC through lead 55 and lead 59 to activate the SPST power relay H which closes its contacts to provide a heavy current through lead 103, contact 87, and armature contact 82 of switch K to the starting solenoid of the internal combustion engine. Protective relay J will remain activated through lead 5 until the heater 46 of delay relay E disconnects the ground circuit of protective relay J through lead 2, armature contact 50, contact 48, contact 47 and lead 51. Current is also provided from contact 13 of protective relay J to the ignition circuitry by way of lead 3, contact 67, armature contact 62, and lead 70 of the selective relay G. Current is also provided, as depicted in FIG. 1, from contact 32 of the power relay H to the choke solenoid M which, in turn, activates the choke and accelerator linkage rod 98. If the motor does not start, or dies after starting, no current draw exists to cause battery rundown. After the motor starts, generator or alternator current is supplied from conductor means 89, switch arm 80, and its contact 83, and lead 72 to the coil 71 of the relay G which causes armature contacts 60, 61 and 62 to make with contacts 64, 66 and 68 respectively. When the armature contact 61 of the selector relay G makes with contact 66, the starting solenoid circuit is broken and existing electric current through the lead 56 energizes the coil 27 which activates the latch relay F, causing armature contacts 21 and 23 to make with contacts 20 and 25, which provide electric current through lead 57 to armature contacts 60 and 64, of the selector relay G, through conductor means 58 to the accessory circuit of the vehicle and also through lead 57, armature contact 62 and contact 68, through conductor means 70 to the ignition circuit of the vehicle. As long as the coil 71 of the selector relay G is energized by the generator or alternator current, electric current will be provided to the accessory and ignition circuits of the vehicle. Electric current is also supplied through the lead 73, diode N through lead 104 to the parking light circuitry, to provide a visible indication that the motor has started. Reactivating the transmitter B closes the receiver relay D, energizes the protective relay J, the armatures 17 and 19 thereof then make with contacts 12 and 13 respectively, thus providing current from the contact 12, through the lead 55, armature contact 61 and contact 66, through lead 56 to the coil 27 of the latch relay F, which activates the latter, breaking the ignition circuits and causing the motor to stop.

The alternate circuit for the pushbutton or timer operates in a like manner, except for transmission and receiver operations, as is obvious.

Figure 2:
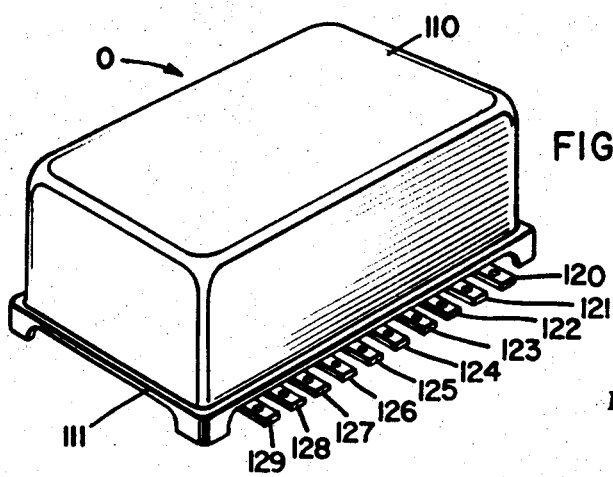
FIG. 2 is a perspective view of a preferred form of enclosure for housing components of the system of this invention.

Referring to FIG. 2, the terminals extending from the interior of the enclosure O, are provided for electrical connection with components exteriorly of the enclosure, for example, as follows, 120 with the switch arm 81 of switch K; 121 with the contact 87 of switch K and the choke solenoid M; 122 with the ignition post on the ignition switch of the vehicle; 123 and 134 with the conventional hot and cold sides respectively of the receiver relay D; 125 with the accessories post on the ignition switch of the vehicle; 126 with the generator (or alternator) output; 127 to the receiver C; 128 to the receiver ground; and 129 to ground for system A.

The protective relay means J will function to protect one or more of the other components of the system of the invention against malfunctioning. It will function also to protect against inadequate electrical current supply to the system, or protect against one or the other of these contingencies, as the case may be, when interposed in the system as detailed. Thus it has dual functions as may be required.

Wireless receivers B employed in the system A will be designed to operate on a 12-VDC power source. When an automobile is idle or operating, this voltage is adequate and available. However during cranking, the voltage source drops to a level of 9 to 10 volts, which are inadequate for receiver operation. Therefore, when the receiver relay D energizes the protective relay J, the protective relay contacts close and lock the relay in an energized configuration and it is no longer dependent on receiver operation for proper functioning. Consequently, the protective relay J assures the relay system of adequate voltage and current independent of receiver-operating requirements.

Since the protective relay is locked in an energized configuration, the delay relay E is necessary to provide a timing circuit to unlock the protective relay by interrupting its coil ground circuit. Consequently, should the engine fail to start within a certain time period (e.g. 5 seconds), the delay relay will cause the protective relay to become deenergized and return it to its prior or an original configuration.

What is claimed is:

1. A system for the remote-controlled energization and deenergization of components of an internal combustion engine-powered vehicle, said components including the electrical starter circuitry, including a starter solenoid, and generator circuitry including a generator; the electrical ignition circuitry accessory and light circuitry; their associated electrical circuitry; and the choke and accelerator mechanisms, said system including a manually operated electric switch means, for selectively electrically connecting said system with a direct-current supply circuit and disconnecting said system from said direct-current supply circuit, and to reroute said circuit from said starter and generator circuitries through said system; electrical protective relay means to protect said system and said associated electrical circuitry against heavy current flow and to assure said system operation at a reduced voltage output of said direct-current supply source, said protective relay means being in circuit with said ignition and accessory circuitries; electrical delay relay means to provide a timing circuit for said system operation and to protect said system and said associated electrical circuitry against system malfunction of said system and an inadequacy of said direct-current supply source to said system, in circuit with said protective relay means; electrical selector relay means to relay electric current to the accessory circuitry, ignition circuitry and said solenoid on a timed basis as determined by the generator output; electrical latch relay means to relay electric current to said ignition circuitry and accessory circuitry through said selector relay means; said selector relay means being in circuit with said latch relay means; electric power relay means to relay heavy electric current from said direct-current supply circuit to said starter solenoid; choke solenoid means in circuit with said electrical power relay means and selector relay means for operative connection with said accelerator and said choke for operation thereof: and remote control means for transmitting electric signals to said protective relay means and in circuit with said protective relay means and said switch means.

2. A system as defined in claim 1 characterized in that said remote control means comprises a wireless receiver, having a receiver relay, and a wireless transmitter, constructed and arranged to transmit coded signals to said receiver, and said receiver relay is in electrical circuit with said protective relay.

3. The system as defined in claim 2 characterized in that said delay relay is a SPDT relay with normally open contact and electrically connected with said receiver relay said choke solenoid and the armatures of said latch and selector relays.

4. A system as defined in claim 2 characterized in that said protective relay is a DPDT relay.

5. A system as defined in claim 2 characterized in that said delay relay is a SPDT relay and said relay is a DPDT relay constructed and arranged for its armature to remain in a first or a second position on alternate energizing cycles of the coil thereof.

6. A system as defined in claim 2 characterized in that said selector relay is a 3PDT relay.

7. A system as defined in claim 2 characterized in that said switch is a 3PDT on-off switch.

8. A system ad defined in claim 2 characterized in that said switch is a 3PDT switch and is electrically connected with said receiver.

9. A system as defined in claim 2 characterized in that said transmitter is a hand-held transmitter and a portable housing contains and relays.